United States Patent
Wu et al.

(10) Patent No.: US 10,711,124 B1
(45) Date of Patent: Jul. 14, 2020

(54) ETHYLENE VINYL ALCOHOL PELLETS AS WELL AS FILMS THEREOF

(71) Applicant: CHANG CHUN PETROCHEMICAL CO., LTD., Taipei (TW)

(72) Inventors: Hou Hsi Wu, Taipei (TW); Wen Hsin Lin, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

(21) Appl. No.: 16/729,984

(22) Filed: Dec. 30, 2019

(51) Int. Cl.
| | | |
|---|---|---|
| *C08L 23/08* | (2006.01) | |
| *C08L 29/04* | (2006.01) | |
| *C08L 27/12* | (2006.01) | |
| *C08J 3/12* | (2006.01) | |

(52) U.S. Cl.
CPC ............ *C08L 23/08* (2013.01); *C08J 3/12* (2013.01); *C08L 27/12* (2013.01); *C08L 29/04* (2013.01); *C08L 2203/16* (2013.01); *C08L 2205/14* (2013.01)

(58) Field of Classification Search
CPC .......... C08L 23/08; C08L 29/04; C08L 27/12; C08L 2205/14; C08L 2203/16; C08J 3/12
USPC ......................................................... 525/57
See application file for complete search history.

(56) References Cited

U.S. PATENT DOCUMENTS

| 5,460,760 | A | * | 10/1995 | Tsai | ................ C08L 29/04 |
|---|---|---|---|---|---|
| | | | | | 264/39 |
| 2003/0096101 | A1 | * | 5/2003 | Kazeto | ................ C09D 5/03 |
| | | | | | 428/323 |
| 2006/0121270 | A1 | | 6/2006 | Kazeto | |
| 2008/0199645 | A1 | * | 8/2008 | Julien | ................ A61J 1/1475 |
| | | | | | 428/36.7 |
| 2009/0098395 | A1 | * | 4/2009 | Lu | ................ C09D 7/70 |
| | | | | | 428/454 |
| 2009/0274917 | A1 | | 11/2009 | Kazeto | |
| 2019/0345309 | A1 | | 11/2019 | Okamoto et al. | |

FOREIGN PATENT DOCUMENTS

| JP | 2000001593 A | | 1/2000 |
|---|---|---|---|
| JP | 2001081262 A | | 3/2001 |
| JP | 2006282835 A | * | 10/2006 |
| JP | 4832783 B2 | | 12/2011 |
| JP | 2017088666 A | | 5/2017 |
| WO | 2015021198 A1 | | 2/2015 |

* cited by examiner

*Primary Examiner* — Michael Bernshteyn
(74) *Attorney, Agent, or Firm* — Polsinelli PC (57) ABSTRACT

The instant disclosure relates to ethylene vinyl alcohol pellets including one or more fluorine-containing microparticles having a particle size that is not greater than 20 µm. The EVOH films formed from the EVOH pellets may have a Charpy impact strength of at least 2.45 KJ/m² according to ISO 179-1 at 23° C. and an elongation at break of at least 17.8% according to ISO 527-2 at 23° C.

19 Claims, 3 Drawing Sheets

ETHYLENE VINYL ALCOHOL PELLETS AS WELL AS FILMS THEREOF

FIELD OF THE DISCLOSURE

The instant disclosure relates to ethylene vinyl alcohol resins ("EVOH") and pellets thereof. The ethylene vinyl alcohol pellet(s) have micro-particles and, in particular, fluorine-containing micro-particles. Films formed from the ethylene vinyl alcohol resins and/or pellets are also disclosed herein.

BACKGROUND OF THE DISCLOSURE

EVOH resins are widely used in laminates for preserving perishable items. For example, EVOH resins and laminates are commonly used by the food packaging industry, medical device and supplies industry, pharmaceutical industry, electronics industry, and agricultural chemicals industry. EVOH resins are often incorporated as a distinct layer within a laminate to serve as an oxygen-barrier layer.

Die build-up often occurs during extruding processes utilizing EVOH copolymers. Another common problem with extruding processes utilizing EVOH copolymers is undesirable screw sticking. These problems may reduce the visual appearance of films formed from the EVOH copolymers as well as the mechanical strength. Moreover, these issues have not be sufficiently addressed or solved with convention technology.

Thus, there is a continued need for EVOH resins that provide better film properties and enable cost effective manufacturing processes.

SUMMARY OF THE INVENTION

Aspects of the disclosure are directed to ethylene vinyl alcohol ("EVOH") pellets having micro-particles and, in particular, fluorine-containing micro-particles. The EVOH resins and/or pellets may be used to produce films or multi-layer structures. It has been conventional wisdom to avoid combining EVOH copolymers and fluorinated polymers because of their immiscibility. For example, the immiscibility of EVOH copolymers and fluorinated polymers was expected to adversely affect the appearance and the mechanical properties of films formed therefrom.

While the combination of EVOH copolymers and fluorinated polymers (referred herein also as "fluoropolymers") has been traditionally avoided due to problems arising from immiscibility, aspects of the disclose utilize certain fluoropolymers that are partially miscible (and partially immiscible) to produce EVOH resins and pellets thereof having improved precipitation at the die and reduced screw sticking problems. Additionally, it was discovered that the EVOH pellets disclosed herein may provide improved flexibility and increased mechanical properties to films and multi-layer structures formed therefrom. Specifically, by utilizing EVOH pellets having fluorine-containing micro-particles, the inventors realized that EVOH films could be obtained having improved strength (e.g., as measured by Charpy impact testing) and improved flexibility (e.g., as measured by elongation at breakage). For example, the inventors were able to obtain EVOH films having a Charpy impact strength of at least 2.3 $KJ/m^2$ according to ISO 179-1 at 23° C. and an elongation at break of at least 17.8% according to ISO 527-2 at 23° C. It was surprising that EVOH pellets having the fluorine-containing micro-particles described herein would provide such advantageous improvements in the strength and flexibility of films formed from such EVOH pellets.

The EVOH pellets typically comprise an ethylene-vinyl alcohol copolymer and one or more fluorine-containing micro-particle(s) having a particle size that is not greater than 20 μm. The EVOH pellets preferably have at least two melting point temperatures—in other words, at least a first melting point temperature and a second melting point temperature. The first melting point temperature may be from about 100° C. to about 140° C. or from 105° C. to 135° C. The second melting point temperature may be from about 150° C. to about 195° C. or from 158° C. to 190° C.

The fluorine containing micro-particles may have about 1.5 to about 48 weight % of fluorine, based on the total weight of carbon, oxygen and fluorine elements.

Additionally or alternatively, the ethylene-vinyl alcohol copolymer of the EVOH pellets may have a degree of saponification of 99.5 mole % or more. The ethylene-vinyl alcohol copolymer may have an ethylene content of about 20 to about 50 mole %. For example, the ethylene content of the ethylene-vinyl alcohol copolymer may be about 25 to about 45 mole %. In some instances, the EVOH pellet(s) are free of polyalkyleneoxides.

Preferably, the micro-particles of the EVOH pellet may have a particle size about 1.0 to about 19 μm. For instance, the particle size of micro-particles may be about 1.2 to about 16 μm.

According to at least one embodiment, the EVOH pellet(s) comprises:
- an ethylene-vinyl alcohol copolymer comprising an ethylene content of about 20 to about 50 mole % and having a degree of saponification of 99.5 mole % or more;
- at least two melting point temperatures, a first melting point temperature of about 100° C. to about 140° C. and a second melting point temperature of about 150° C. to about 195° C.; and
- fluorine-containing micro-particle dispersed in the pellet, the fluorine-containing micro-particle comprising:
  (i) a particle size not greater than 20 μm;
  (ii) a fluorinated polymer.

Films formed from the EVOH pellets typically have a Charpy impact strength of at least 2.3 $KJ/m^2$ and an elongation breakage percentage of at least 17.8%. Preferably, the film has a Charpy impact strength of at least 2.6 $KJ/m^2$. In some cases, the film may have an elongation breakage percentage of at least 20%.

BRIEF DESCRIPTION OF THE FIGURES

Implementation of the present technology will now be described, by way of example only, with reference to the attached figures, wherein.

It should be understood that the various aspects are not limited to the arrangements, instrumentality, and characteristics shown in the drawings.

DETAILED DESCRIPTION OF THE DISCLOSURE

Aspects of the disclosure are directed to ethylene vinyl alcohol ("EVOH") resins and pellets thereof. The EVOH pellet(s) have micro-particles, particularly fluorine-containing micro-particles, dispersed therein. The EVOH pellets may be used to produce films or multi-layer structures.

In accordance with one aspect of the disclosure, provided is EVOH pellet(s). As used herein, EVOH pellet(s) refer to an EVOH resin that has been pelletized to be in the form and/or shape of one or more pellets. Although an EVOH resin pelletized to be in the form of one or more EVOH pellet(s) is described throughout the instant disclosure, the EVOH resins may be processed to be in the form of beads, cubes, chips, shavings, or the like. The EVOH pellets of the instant disclosure typically include an ethylene-vinyl alcohol copolymer and one or more fluorine-containing micro-particle(s) having a particle size that is not greater than 20 μm.

Figure 1:
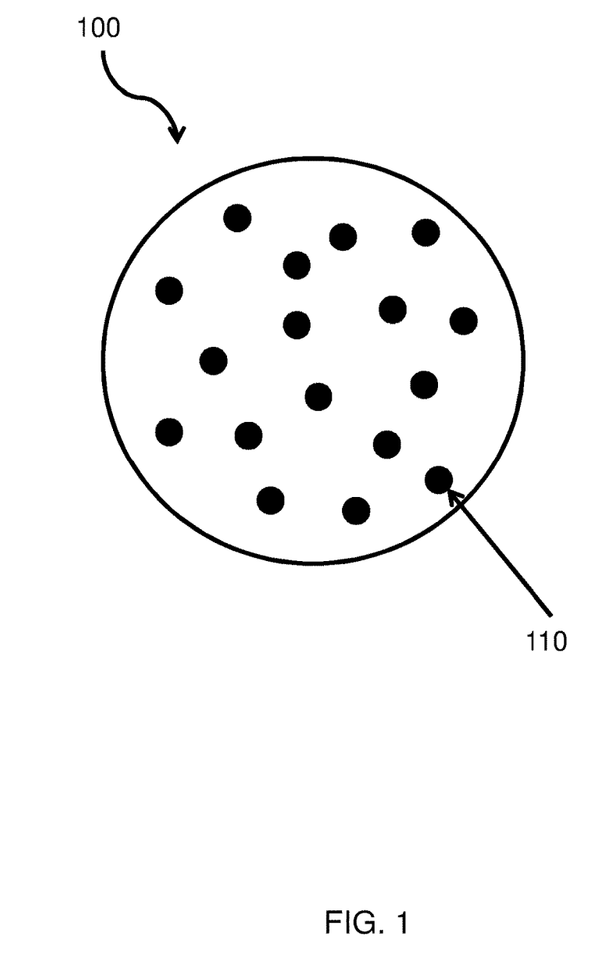
FIG. 1 is a cross-sectional depiction of an exemplary EVOH pellet in accordance with aspects of the disclosure.

FIG. 1 depicts a cross-section of an exemplary EVOH pellet 100 in accordance with aspects of the disclosure. EVOH pellet 100 is formed from an EVOH copolymer having an ethylene content. For example, the EVOH copolymer may have an ethylene content of about 20 to about 50 mole %, about 25 to about 45 mole %, about 28 to about 42 mole %, or about 30 to about 40 mole %. EVOH pellet 100 may be formed of two or more EVOH copolymers having different ethylene contents. For example, one of the EVOH copolymers may have an ethylene content in the range of about 20 to about 35 mole %, such as about 24 to about 35 mole %, about 28 to about 35 mole %; from about 20 to about 32 mole %, about 24 to about 32 mole %, about 28 to about 32 mole %; from about 20 to about 30 mole %, or about 24 to about 30 mole %. Additionally or alternatively, one of EVOH copolymers may have an ethylene content in the range of about 36 to about 50 mole %, such as about 40 to about 50 mole %, about 44 to about 50 mole %; from about 36 to about 45 mole %, or about 40 to about 45 mole %. In some preferred instances, however, EVOH pellet 100 is formed from a single EVOH copolymer having an ethylene content of about 20 to about 50 mole %.

EVOH pellet 100 has an amount of fluorine associated with the incorporation of one or more fluorinated polymer (also referred to herein as "fluoropolymer"), which can form fluorine-containing micro-particles 110 dispersed in the EVOH pellet 100. For example, the one or more fluoropolymers may include or be chosen from polyvinylidene fluoride ("PVDF"), polytetrafluoroethylene, polyhexafluoropropylene, polychlorotrifluoroethylene, 2-chloropentafluoropropene, dichlorodifluoroethylene, 1,1-dichlorofluoroethylene, and combinations thereof. Additionally or alternatively, the fluoropolymer may include copolymers derived from at least one of vinylidene fluoride ("VDF"), hexafluoropropylene ("HFP"), and tetrafluoroethylene ("TFE"). In some instances, the fluoropolymer may include copolymers derived from two or more of VDF, HFP, and TFE. For example, EVOH pellet 100 may include a copolymer derived from VDF and HFP, a copolymer derived from TFE and HFP, a copolymer derived from VDF and TFE, and/or a copolymer derived from VDF, HFP, and TFE. While not being limited to any specific theory, the inventors believe that certain fluoropolymers can reduce at least one of the melting points of the EVOH pellet 100 by producing a reduction in the crystalline size.

The fluorine-containing micro-particles 110 may have about 1.5 to about 48 weight (wt.)% of fluorine, based on the total weight of carbon, oxygen, and fluorine elements of EVOH pellet 100. EVOH pellet 100 may in further instances have about 1.8 to about 44 wt. % of fluorine or about 2.1 to about 41 wt. % of fluorine, based on the total weight of carbon, oxygen, and fluorine elements of EVOH pellet 100.

The fluorine-containing micro-particles 110 of EVOH pellet 100 may have a particle size with a diameter or a length of the major axis across a cross-sectional area of 1.0 to about 19 μm or, preferably, 1.2 to about 16 μm. The size of the fluorine-containing micro-particles may be controlled by controlling the type or species of fluoropolymer, the amount of fluoropolymer, and the ethylene content of the EVOH copolymer. If the fluorine-containing micro-particle is a sphere, the diameter of a cross-sectional area of the fluorine-containing micro-particle is used to determine if the fluorine-containing micro-particle has a desirable particle size. In a case where the fluorine-containing micro-particle is not a sphere and/or the cross section of fluorine-containing micro-particle has a shape other than a circle, such as an ellipse or agglomeration, the length of the major axis of a cross-sectional area of the fluorine-containing micro-particle is used to determine if the fluorine-containing micro-particle has a desirable particle size. In some instances, all of the fluorine-containing micro-particles 110, as assessed over a cross section of an EVOH pellet, have a particle size of not greater than 20 μm, such as not greater than 19 μm, not greater than 18 μm, not greater than 16 μm, not greater than 14 μm, or not greater than 12 μm. In other words, in some instances, none of the fluorine-containing micro-particles 110 have a particle size of greater than 20 μm, such as greater than 19 μm, greater than 18 μm, greater than 16 μm, greater than 14 μm, or greater than 12 μm. The fluorine-containing micro-particles 110 may have a particle size of 0.1 μm or more, 0.3 μm or more, 0.5 μm or more, or 0.7 μm or more. For example, EVOH pellet 100 may have fluorine-containing micro-particles 110 with a particle size of 1.0 to about 19 μm or 1.2 to about 16 μm. In some instances, all of fluorine-containing micro-particles 110, as assessed over a cross section of an EVOH pellet 100, are within the desired particle ranges discussed herein. In some cases, however, a majority of fluorine-containing micro-particles 110, as assessed over a cross section of an EVOH pellet 100, are within the desired particle ranges. Exemplary procedures for determining the particle size within the desired range may include: (a) the amount of fluoropolymer, (b) the ethylene content of EVOH, (c) the type of fluoropolymer (d) the temperature in extruder and (e) the rotational frequency of screw. In this invention, as long as the EVOH pellet containing the fluorine-containing micro-particles within the desired particle ranges, the both processability and the mechanical properties are improved.

Figure 2:
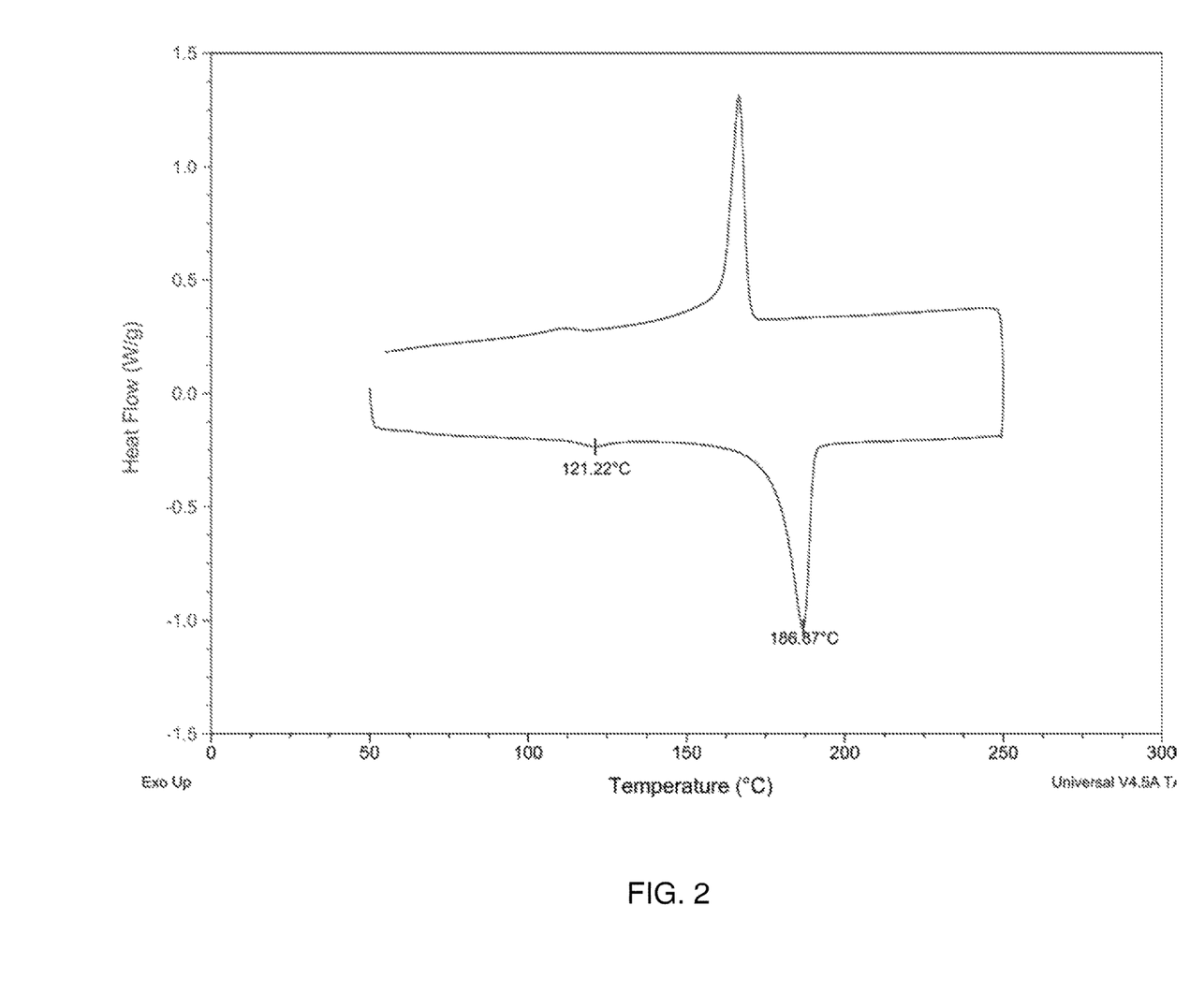
FIG. 2 is a graph of the two melting point temperatures of an exemplary EVOH pellet according to aspects of the disclosure.

As illustrated by FIG. 2, EVOH pellet 100 may have at least two melting point temperatures. In some instances, one (e.g., a first) of the melting point temperatures of EVOH pellet 100 is from about 100° C. to about 140° C.—e.g., from about 105° C. to about 135° C., about 110° C. to about 135° C., or about 120° C. to about 130° C. Additionally or alternatively, one (e.g., a second) of the melting point temperatures may be from about 150° C. to about 195° C.—e.g., about 158° C. to about 190° C. or about 164° C. to about 187° C. In some instances, EVOH pellet 100 has at least three different melting point temperatures. In other instances, EVOH pellet 100 includes at least four, at least five, or at least six different melting point temperatures. Additionally and/or alternatively, EVOH pellet 100 may have a degree of saponification of 90 mole % or more, preferably 95 mole % or more, preferably 97 mole % or more, preferably is 99.5 mole % or more.

The EVOH resin or pellet 100 thereof may be free of or substantially free of polyalkyleneoxides. For example, EVOH pellet 100 may have less than 5 wt. %, such as less than 4 wt. %, less than 3 wt. %, less than 2 wt. %, less than 1 wt. %, or less than 0.5 wt. % of polyalkyleneoxides.

Figure 3:
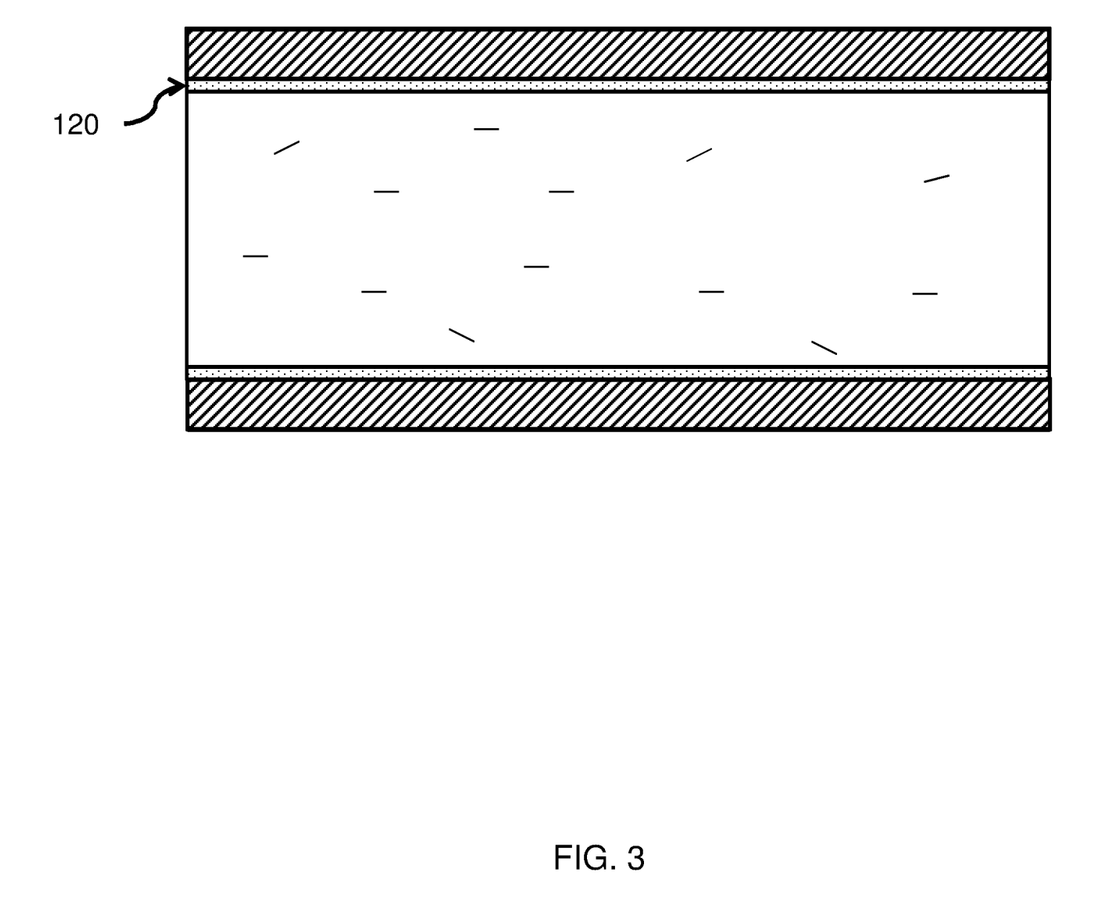
FIG. 3 is a cross-sectional depiction of an extruder with melted EVOH pellets according to aspects of the disclosure flowing therethrough.

EVOH pellet(s) 100 advantageously enable more efficient manufacture of EVOH films formed therefrom. For example, EVOH pellets 100 may improve precipitation at the die and reduce screw sticking problems during manufacture of EVOH films. Suitable processes and equipment for the manufacture of EVOH films may include those readily known by one of ordinary skill in the art. By utilizing fluoropolymers that are partially miscible (and partially immiscible) and producing EVOH pellets containing fluorine-containing micro-particle(s) 110, the inventors believe that a portion of the fluoropolymers segregates and forms a coating layer 120 on the inner surface of the extruder. FIG. 3 depicts the formation of a coating layer 120 on the inner surface of an extruder by a portion of the fluoropolymers of an EVOH pellet disclosed herein. Additionally, the EVOH pellets may advantageously enable the extrusion process to occur at increased temperatures without discoloring the produced EVOH film, as the layer of fluorinated polymer coating the extruder inner wall may protect the EVOH resin flowing through the extruder.

According to another aspect of the disclosure, provided is an EVOH film formed from the EVOH resin or pellets 100 thereof. The EVOH film has a Charpy impact strength of at least 2.3 KJ/m$^2$ according to ISO 179-1 at a temperature 23° C. and an elongation at break of at least 17.8% according to ISO 527-2 at a temperature of 23° C. For some embodiments, the EVOH film may have a Charpy impact strength of at least 3 KJ/m$^2$, at least 4.5 KJ/m$^2$, at least 5.5 KJ/m$^2$, or at least 6.5 KJ/m$^2$ according to ISO 179-1 at a temperature 23° C. For obtaining the above Charpy impact strength values, the test specimens should be maintained at a relative humidity of 50%±5% and a temperature of 23° C.±2° C. for 16 hours before being testing using the ISO 179-1 procedure. Additionally, the impact energy should be set to 7.5 J, the impact direction should be edgewise, the specimen type should be 1 eA, the average width of the specimen should be 10.06 mm, and the average thickness of the specimen should be 3.94 mm. The depth of the notch for testing should be 8.09 mm, the testing temperature should be 23° C.±2° C., and the fracture type should be C. The EVOH film may have an elongation breakage percentage of at least 20% according to ISO 527-2 at a temperature of 23° C. In some instances, the EVOH film has an elongation breakage percentage of at least 21%, at least 22%, at least 23%, or at least 24% according to ISO 527-2 at a temperature of 23° C. For obtaining the above values for the elongation at break, the testing method edition should be 2012, the testing speed 50 mm/min, the specimen type should be 1 A, and the average thickness of the specimen should be 3.99 mm.

EXAMPLES

The following non-limiting examples of aspects of the invention are provided primary for the purpose of elucidating aspects of the invention and the benefits derived therefrom.

Example 1

Four fluoropolymers (Example Fluoropolymers A-D) were prepared according to aspects of the disclosure. Example Fluoropolymers A-D were subsequently used for producing ethylene vinyl alcohol (hereafter "EVOH") pellets according to the instant disclosure. Although Example Fluoropolymers A-D were prepared according to the specific process disclosed below, other types of fluoropolymers may be used for addition with the EVOH.

Example Fluoropolymer A

Example Fluoropolymer A was produced using an autoclave as batch reactor. The autoclave had an internal volume of about 20 liters and was equipped with an electromagnetic induction stirrer. The autoclave was sufficiently scavenged with nitrogen gas ($N_2$) and was subsequently filled with reduced pressure nitrogen gas five times.

While applying a reduced pressure within the autoclave, 6,960 grams (g) of deoxygenated pure water, 3,204 g of 1,1,2-trichloro-1,2,2-trifluoroethane, and 3.5 g of methylcellulose was added into the autoclave. The methylcellulose had a viscosity of 50 cp and was stirred into the composition within the autoclave at 450 rpm to act as a suspension stabilizer. The composition within the autoclave was kept at a temperature of 52° C.

A monomer composed of 25.3 wt. % of vinylidene fluoride (VDF), 68.6 wt. % of hexafluoropropylene (HFP), 6.1 wt. % of tetrafluoroethylene (TFE), was mixed into the batch as a charging gas, and charged to 10 kg/cm$^2$. Subsequently, 45.6 g of a solution of about 90 wt. % of 1,1,2-trichloro-1,2,2-trifluoroethane and 10 wt. % of diisopropyl peroxydicarbonate was charged as a catalyst to initiate polymerization. The diisopropyl peroxydicarbonate acted as an initiator for initiating polymerization. Because the pressure is reduced during the polymerization reaction, a mixed monomer having 44.7 wt. % of VDF, 32.5 wt. % of HFP, and 22.8 wt. % of TFE was added to increase the pressure back up to 10 kg/cm$^2$. After the completion of the polymerization reaction, the remaining mixed monomer was scavenged, and the resulting suspension was dehydrated with a centrifugal separator, washed with DI water, and then vacuum dried at 100° C. to obtain about 7.5 kg of Example Fluoropolymer A.

Example Fluoropolymer B

Example Fluoropolymer B was produced using a similar autoclave and set up as used to produce Example Fluoropolymer A. The autoclave was also repeatedly filled with reduced pressure-$N_2$ five times.

While applying a reduced pressure within the autoclave, 7200 g of deoxygenated pure water, 3250 g of 1,1,2-trichloro-1,2,2-trifluoroethane and 4 g of methylcellulose was added into the autoclave. The methylcellulose had a viscosity of 50 cp and was stirred into the batch within the autoclave at 500 rpm to act as a suspension stabilizer. The batch within the autoclave was kept at a temperature of 52° C.

A monomer composed of 25 wt. % of VDF, 55 wt. % of HFP, and 20 wt. % of TFE was used as a charging gas, and charged to 20 kg/cm$^2$. Subsequently, 40 g of a solution of about 85 wt. % 1,1,2-trichloro-1,2,2-trifluoroethane and 15 wt. % of diisopropyl peroxydicarbonate was charged as a catalyst to initiate polymerization. The diisopropyl peroxydicarbonate acted as an initiator for initiating polymerization. Because the pressure was reduced during the polymerization reaction, a mixed monomer of 40 wt. % of VDF, 35 wt. % of HFP, and 25 wt. % of TFE was added to increase the pressure back up to 20 kg/cm$^2$. After the completion of the polymerization reaction, the remaining mixed monomer was scavenged, and the resulting suspension was dehydrated with a centrifugal separator, washed with DI water, and then vacuum dried at 100° C. to obtain about 6 kg of Example Fluoropolymer B.

Example Fluoropolymer C

Example Fluoropolymer C was produced using an autoclave and an induction stirrer that were similar to those used to produce Example Fluoropolymer A. The autoclave was sufficiently scavenged with nitrogen gas, and charged with 3 liters of a composition of deoxidized purified water and 30 g of ammonium perfluorodecanoate, which acted as emulsifier. The composition within the autoclave was heated to 60° C. and stirred at 380 rpm.

The autoclave was then charged with a gas mixture of about 70 wt. % of VDF and about 30 wt. % of HFP until the internal pressure of the autoclave reached 20 kg/cm². Subsequently, 40 g of a solution contain about 80 wt. % of 1,1,2-trichloro-1,2,2-trifluoroethane and 20 wt. % of diisopropyl peroxydicarbonate was added into the autoclave using nitrogen. The diisopropyl peroxydicarbonate acted as an initiator for initiating polymerization.

The internal pressure within the autoclave was maintained at 20 kg/cm² during polymerization by successively injecting a gas mixture of VDF (62 wt. %) and HFP (38 wt. %). Because the polymerization rate decreased along with the progress of polymerization, an additional 30 g of solution containing about 80 wt. % of a 1,1,2-trichloro-1,2,2-trifluoroethane solution and 20 wt. % of diisopropyl peroxydicarbonate was injected using nitrogen gas 3 hours after the initiation of the polymerization reaction. The monomers were polymerized for an additional 3 hours and the resulting suspension was dehydrated with a centrifugal separator, washed with DI water, and then vacuum dried at 100° C. to obtain about 7.2 kg of Example Fluoropolymer C.

Example Fluoropolymer D

Example Fluoropolymer D was produced using an autoclave having a volume of about 3 liter, which served as a batch reactor. The autoclave had an electromagnetic induction stirrer. A batch of 936 g of DI water, 0.36 g of methylcellulose, 360 g of VDF, 0.3 g of tert-butylperoxyprivalate, 0.36 g of sodium pyrophosphate, 0.36 g of acidic sodium pyrophosphate, and 1.8 g of diethyl carbonate was charged and added into the autoclave. The batch was stirred at 10° C. for 30 minutes, and then warmed to 45° C. for 140 minutes.

The maximum pressure within the autoclave was 6 MPa. The polymerization of the monomers was terminated when the pressure in the autoclave was reduced to 2.5 MPa, which occurred 15 hours after the initial warming of the monomers. After the polymerization was completed, the polymer slurry was withdrawn, dehydrated, washed with DI water, dehydrated and then dried at 80° C. for 24 hours to obtain a vinylidene fluoride polymer (Example Fluoropolymer D) having an inherent viscosity of 2.05 dl/g and a bulk density of 0.225 g/ml at a yield of 55%.

Example 2

A non-limiting method for preparing EVOH pellets is provided below. Twenty seven non-limiting, exemplary EVOH pellets containing fluoro micro-particles (Example EVOH Pellets 1-27) and five comparative EVOH pellets (Comparative EVOH Pellets 1-5) were prepared according to methods similar to the method disclosed below. However, the specific methods for producing EVOH Pellets 1-27 and Comparative EVOH Pellets 1-5 typically varied from the method disclosed below in one or more ways.

An ethylene-vinyl acetate copolymer (hereafter "EVAC") with an ethylene content of 29%, by mole, underwent saponification by 99.5% to produce EVOH polymers. Subsequently, the EVOH was dissolved into solution comprising methanol and water in a ratio of 70:30. After dissolving the EVOH into the solution of methanol and water, the solution had a 41 wt. % solid content of EVOH and was maintained at a temperature of 60° C.

The solution of methanol, water, and EVOH was then pelletized using underwater pelletization. Specifically, the solution of methanol, water, and EVOH was pumped into feeding tube with a flow rate of 120 L/min. The solution was transferred to an inlet pipe, which had a diameter of 2.8 mm, and then cut by a rotating knife at a speed of 1,500 rpm. The EVOH pellets were cooled by adding water having a temperature of 5° C. The EVOH pellets were subsequently centrifuged to separate the EVOH pellet into particles. The separated EVOH particles were washed with water and dried to obtain an EVOH pellet.

The EVOH pellet was blended with a fluoropolymer, e.g., such as those discussed in Example 1, at certain ratios and then transferred into a twin screw extruder. The twin screw extruder had different temperatures along thirteen zones, as summarized in Table 1, below. After compounding, strand cutting was employed at a temperature of 25° C. to produce EVOH pellets containing micro-particles having a fluorine element (also referred to herein as fluoro micro-particles). In Table 1, "EV27" refers to an EVOH having an ethylene content of 27 mole %, "EV29" refers to an EVOH having an ethylene content of 29 mole %, "EV32" refers to an EVOH having an ethylene content of 32 mole %, "EV38" refers to an EVOH having an ethylene content of 38 mole %, and "EV44" refers to an EVOH having an ethylene content of 44 mole %.

TABLE 1

| Twin Screw Extruder Process Condition (° C.) | | | | | | | | | | | | | |
| --- | --- | --- | --- | --- | --- | --- | --- | --- | --- | --- | --- | --- | --- |
| Barrel | Zone 1 | Zone 2 | Zone 3 | Zone 4 | Zone 5 | Zone 6 | Zone 7 | Zone 8 | Zone 9 | Zone 10 | Zone 11 | Zone 12 | Zone 13 |
| EV27 | 190 | 190 | 195 | 195 | 195 | 200 | 200 | 205 | 205 | 210 | 210 | 215 | 215 |
| EV29 | 190 | 190 | 195 | 195 | 195 | 200 | 200 | 205 | 205 | 205 | 210 | 210 | 215 |
| EV32 | 185 | 185 | 190 | 190 | 190 | 195 | 195 | 200 | 200 | 205 | 205 | 210 | 210 |
| EV38 | 175 | 175 | 185 | 185 | 185 | 195 | 195 | 195 | 200 | 200 | 205 | 205 | 205 |
| EV44 | 170 | 170 | 170 | 170 | 175 | 175 | 180 | 180 | 180 | 185 | 185 | 190 | 195 |

Example 3

Example EVOH Pellets 1-27 were each formed into a film according to the method described below. Films were produced by feeding Example EVOH Pellets 1-27 and Comparative EVOH Pellets 1-5 into a single layer T-die cast film extruder (Optical Control System MEV4). The films formed from Example EVOH Pellets 1-27 and Comparative EVOH Pellets 1-5 each had a thickness of 20 μm. The temperature of the extruder was set to 220° C., while the temperature of the tie was set to 230° C. The rotational frequency of the screw was 7 rotations/minutes (rpm).

Example 4

Example EVOH Pellets 1-27 and Comparative EVOH Pellets 1-5 were assessed to determine the properties of such EVOH pellets and the films formed therefrom. As mentioned above, Example EVOH Pellets 1-27 were prepared according to methods similar to the method described in Example 2, above. However, the methods for producing EVOH Pellets 1-27 varied to produce EVOH pellets having different amounts of ethylene contents, different fluoropolymers, and different amounts of such fluoropolymers. Comparative EVOH Pellets 1-5 were also prepared according to methods similar to that described in Example 2.

Table 2, shown below, provides a summary of certain attributes, namely, the ethylene content of the EVAC, the specific fluoropolymer incorporated into the EVOH pellet, and amount of such fluoropolymer, of Example EVOH Pellets 1-27 and Comparative EVOH Pellets 1-5.

TABLE 2

| | Ethylene Content of EVAC (mole %) | Example Fluoropolymer No. | Amount of added Fluoropolymer (wt. %) |
|---|---|---|---|
| Example EVOH Pellets 1 | 29 | A | 1 |
| Example EVOH Pellets 2 | 29 | A | 2 |
| Example EVOH Pellets 3 | 29 | A | 5 |
| Example EVOH Pellets 4 | 29 | A | 0.1 |
| Example EVOH Pellets 5 | 29 | A | 0.3 |
| Example EVOH Pellets 6 | 44 | A | 0.1 |
| Example EVOH Pellets 7 | 44 | A | 0.3 |
| Example EVOH Pellets 8 | 44 | A | 1 |
| Example EVOH Pellets 9 | 44 | A | 2 |
| Example EVOH Pellets 10 | 44 | A | 5 |
| Example EVOH Pellets 11 | 32 | A | 2 |
| Example EVOH Pellets 12 | 38 | A | 2 |
| Example EVOH Pellets 13 | 27 | A | 1 |
| Example EVOH Pellets 14 | 27 | A | 2 |
| Example EVOH Pellets 15 | 27 | A | 4 |
| Example EVOH Pellets 16 | 32 | A | 1 |
| Example EVOH Pellets 17 | 38 | A | 3 |
| Example EVOH Pellets 18 | 48 | A | 1 |
| Example EVOH Pellets 19 | 48 | A | 2 |
| Example EVOH Pellets 20 | 48 | A | 3 |
| Example EVOH Pellets 21 | 32 | C | 2 |
| Example EVOH Pellets 22 | 32 | B | 0.5 |
| Example EVOH Pellets 23 | 32 | B | 1 |
| Example EVOH Pellets 24 | 32 | B | 2 |
| Example EVOH Pellets 25 | 32 | B | 3 |

TABLE 2-continued

| | Ethylene Content of EVAC (mole %) | Example Fluoropolymer No. | Amount of added Fluoropolymer (wt. %) |
|---|---|---|---|
| Example EVOH Pellets 26 | 29 | D | 1 |
| Example EVOH Pellets 27 | 29 | D | 3 |
| Comparative EVOH Pellets 1 | 29 | — | 0 |
| Comparative EVOH Pellets 2 | 29 | A | 0.06 |
| Comparative EVOH Pellets 3 | 29 | A | 8 |
| Comparative EVOH Pellets 4 | 44 | — | 0 |
| Comparative EVOH Pellets 5 | 44 | A | 8 |

The properties of Example EVOH Pellets 1-27 were assessed by comparing certain Example EVOH Pellets to the Comparative EVOH Pellets having at least one feature that is the same as such Example EVOH Pellets. For example, Table 3 provides a comparison of Example EVOH Pellets 1-5 with Comparative EVOH Pellets 1-3, which were all produced with an EVAC having an ethylene content of 29 mole %, and a comparison of Example EVOH Pellets 6-10 to Comparative EVOH Pellets 4 and 5, which all were produced with an EVAC having an ethylene content of 44 mole %.

TABLE 3

| | Amount of Example Fluoropolymer No. A (wt. %) | Fluorine Content | Particle Size range | Dispersion | $1^{st}$ Melting Point Temp. (C. °) | $2^{nd}$ Melting Point Temp. (C. °) |
|---|---|---|---|---|---|---|
| 29 mol % of Ethylene Content of EVAC | | | | | | |
| Example EVOH Pellets 1 | 1 | 3.5~41 | 1.2~5 | ○ | 121 | 186.9 |
| Example EVOH Pellets 2 | 2 | 8~44 | 1.6~8 | ○ | 122 | 186.4 |
| Example EVOH Pellets 3 | 5 | 9~43 | 1.5~18 | ○ | 125.1 | 186.3 |
| Example EVOH Pellets 4 | 0.1 | 1.8~12 | 0.5~5 | ○ | 125.2 | 186.8 |
| Example EVOH Pellets 5 | 0.3 | 2.1~14.5 | 0.6~6 | ○ | 123.4 | 185.8 |
| Comparative EVOH Pellets 1 | 0 | 0 | NA | X | NA | 187 |
| Comparative EVOH Pellets 2 | 0.06 | ~0 | NA | X | NA | 186.8 |
| Comparative EVOH Pellets 3 | 8 | 16~48.5 | 0.6~40 | X | 128 | 186.6 |
| 44 mol % of Ethylene Content of EVAC | | | | | | |
| Example EVOH Pellets 6 | 0.1 | 1.5~10.5 | 0.7~3 | ○ | 134.6 | 165.6 |
| Example EVOH Pellets 7 | 0.3 | 2~15.6 | 0.7~5 | ○ | 126.3 | 164.7 |

TABLE 3-continued

| | Amount of Example Fluoropolymer No. A (wt. %) | Fluorine Content | Particle Size range | Dispersion | 1$^{st}$ Melting Point Temp. (C. °) | 2$^{nd}$ Melting Point Temp. (C. °) |
|---|---|---|---|---|---|---|
| Example EVOH Pellets 8 | 1 | 3.6~30.6 | 1.2~9 | ○ | 110 | 164.7 |
| Example EVOH Pellets 9 | 2 | 3.8~36.3 | 1.6~10 | ○ | 112 | 164.4 |
| Example EVOH Pellets 10 | 5 | 10~40.6 | 2.5~12 | ○ | 123.3 | 164.8 |
| Comparative EVOH Pellets 4 | 0 | 0 | NA | X | NA | 166 |
| Comparative EVOH Pellets 5 | 8 | 12~45 | 0.6~40 | X | 130.6 | 165 |

To assess the degree of dispersion of the micro-particles within Example EVOH Pellets 1-10 and the Comparative EVOH Pellets 1-5 (if any), at one EVOH pellet from Example EVOH pellets 1-10 and Comparative EVOH Pellets 1-5 was cut to produce a specimen with a thickness of 0.5 mm. The cut surface of each specimen EVOH pellet was then assessed using an optical microscope (a LEICA DM2700M optical microscope sold by LEICA MICROSYSTEMS), a CCD Camera (such as those produced by LEICA MICROSYSTEMS), and analyzed with software (e.g., LAS V4.11 software). The software (e.g., LAS V4.11 software) determined the cross-sectional area of each of the fluorine containing micro-particles. A "X" was given to the EVOH pellet(s) if one or more micro-particles had a particle size of larger than 20 μm or if no micro-particles were formed, while a "0" was given if excellent dispersion was exhibited without agglomeration.

The fluorine content was determined using a Model JSM-6390 scanning electron microscope, produced by Jeol USA Inc., which was set to a voltage of 15 KV, with a working distance 15 mm. Energy dispersive spectroscopy analysis was completed using an Oxford Instrument *INCA* 7582. The spot size of the scanning electron microscope was adjusted to make the dead time of the energy dispersive spectroscopy less than 35%. The acquisition rate for the energy dispersive spectroscopy analysis was set to 1 Kcps. Using the measurements obtained from the scanning electron microscope and energy dispersive spectroscopy, the fluorine content was calculated as a wt. % based on the total content of carbon, oxygen, and fluorine using the element signal peaks of $k_\alpha$0.2774 keV for carbon, $k_\alpha$0.5249 keV for oxygen, and $k_\alpha$0.6768 keV for fluorine. Additionally, the scanning electron microscope was specifically aimed to the micro-particles during the energy dispersive spectroscopy so that the fluorine content primarily reflects the fluorine in the micro-particles.

Example EVOH Pellets 1-10 each exhibited excellent dispersion of the micro-particles containing fluorine and desired micro-particle sizes in accordance with the desired ranges described herein, while Comparative Examples 1-5 exhibited poor dispersion and micro-particles (if any were present) having a size outside of such desired ranges. Based on Table 3, it is clear that adding a fluoropolymer in the amounts discussed herein promotes, in part, the production of EVOH pellets having an excellent dispersion of the micro-particles and desirable micro-particle sizes. For example, although Comparative EVOH Pellets 3 had two melting point temperatures within the desired ranges discussed herein and was produced with an EVAC having an ethylene content that was the same as for Example EVOH Pellets 1-5, Comparative EVOH Pellets 3 exhibited poor dispersion of the micro-particles and also exhibited severe agglomeration, leading to a micro-particle with a size of about 40 μm. By way of another example, Comparative EVOH Pellet 5 was produced with an EVAC having an ethylene content and fluoropolymer that was the same as Example EVOH Pellets 6-10. However, Comparative EVOH Pellet 5 had an amount of fluoropolymer that was higher than the desired range discussed herein and exhibited poor dispersion of the micro-particles containing fluorine as well as micro-particles sizes outside of the desired range discussed herein. Additionally, Comparative EVOH Pellets 1 and 4 were not produced with a fluoropolymer and, thus, no micro-particles were exhibited.

Films were formed from each of Example EVOH Pellets 1-10 and Comparative EVOH Pellets 1-5 in accordance with methods similar that described in Example 3. The films were assessed to determine the appearance of the film, the precipitation at the die, the Charpy impact strength of the film, and the elongation breakage of the film. A summary of the properties of the films formed from Example EVOH Pellets 1-10 and Comparative EVOH Pellets 1-5 is provided below in Table 4.

TABLE 4

| | Film Appearance | Die precipitation | Charpy impact Strength (KJ/m$^2$) | Elongation Breakage (%) |
|---|---|---|---|---|
| Film of Example EVOH Pellets 1 | ○ | ○ | 2.45 | 17.8 |
| Film of Example EVOH Pellets 2 | ○ | ○ | 3.19 | 19.9 |
| Film of Example EVOH Pellets 3 | ○ | ○ | 3.62 | 20.2 |
| Film of Example EVOH Pellets 4 | ○ | ○ | 2.52 | 17.8 |
| Film of Example EVOH Pellets 5 | ○ | ○ | 2.52 | 17.6 |
| Film of Comparative EVOH Pellets 1 | Δ | X | 2.25 | 17.1 |
| Film of Comparative EVOH Pellets 2 | Δ | X | 2.23 | 16.8 |
| Film of Comparative EVOH Pellets 3 | X | ○ | 2.64 | 18.5 |
| Film of Example EVOH Pellets 6 | ○ | ○ | 3.1 | 22.6 |
| Film of Example EVOH Pellets 7 | ○ | ○ | 3.1 | 22.8 |
| Film of Example EVOH Pellets 8 | ○ | ○ | 5.45 | 23.9 |
| Film of Example EVOH Pellets 9 | ○ | ○ | 6.9 | 24.3 |

TABLE 4-continued

|  | Film Appearance | Die precipitation | Charpy impact Strength (KJ/m²) | Elongation Breakage (%) |
|---|---|---|---|---|
| Film of Example EVOH Pellets 10 | ○ | ○ | 6.8 | 24.1 |
| Film of Comparative EVOH Pellets 4 | Δ | X | 2.8 | 21.8 |
| Film of Comparative EVOH Pellets 5 | X | ○ | 5.4 | 23.1 |

For the appearance of the films formed from Example EVOH Pellets 1-10 and Comparative EVOH Pellets 1-5, a "O" was given if the number of fisheyes with a size greater than 200 μm was less than 3 within a square meter, a "a" was given if the number of fisheyes with a size greater than 200 μm was 3 to 10 within a square meter, and a "X" was given if the number of fisheyes with a size greater than 200 μm was greater than 10 within a square meter. Additionally, an "O" was given if no precipitation at the die was exhibited and a "X" was given if precipitation at the die was exhibited.

For the Charpy impact strength values, the test specimens were maintained at a relative humidity of 50%±5% and a temperature of 23° C.±2° C. for 16 hours before being testing using the ISO 179-1 procedure. The applied impact energy was 7.5 J, the impact direction was edgewise, the average width of the specimen was 10.06 mm, and the average thickness of the specimen was 3.94 mm. The depth of the notch was 8.09 mm, the testing temperature was 23° C.±2° C., and the fracture type was C.

For the elongation at break, the testing method edition was 2012, the testing speed was 50 mm/min, the specimen type was 1 A, and the average thickness of the specimen was 3.99 mm.

The films of Example EVOH Pellets 1-10 did not exhibit precipitation at the die and had less than three fisheyes with a size greater than 200 μm within a square meter. The Charpy impact strength of the films of Example EVOH Pellets 1-10 ranged from 2.45 to 6.9 KJ/m². The elongation breakage of the films formed from Example EVOH Pellets 1-10 ranged from 17.8 to 24.3%.

The films of Comparative EVOH Pellets 1, 2, and 4 exhibited precipitation at the die and had 3 to 10 fisheyes with a size greater than 200 μm within a square meter. As shown by a comparison of the film formed from Example EVOH Pellets 1 to the film formed from Comparative EVOH Pellets 1, the addition of Example Fluoropolymer A provided improved mechanical properties. Additionally, comparing the film of comparative EVOH Pellets 1 and 2, with the film of Example EVOH Pellets 1-4 shows the charpy impact strength and elongation breakage is significantly improved by including the desired amounts of fluoropolymers discussed herein. Although the films of Comparative EVOH Pellets 3 and 5 did not exhibit precipitation at the die, such films still exhibited greater than 10 fisheyes with a size greater than 200 μm within a square meter.

While not being limited to any one theory, the inventors believe that the large amount of fluoropolymer included in Comparative EVOH Pellets 3 and 5 produced too much agglomeration, which adversely affected the number of fisheyes with a size greater than 200 μm within a square meter of the film. However, when the size of the microparticles were controlled to within the desired range, the films of the Example EVOH Pellets not only showed better mechanical properties, such as charpy impact strength and elongation breakage, but also showed better processability and appearance of the film.

The effect of producing EVOH pellets using EVAC having different ethylene contents was assessed by comparing Example EVOH Pellets 1, 3, 8, and 10-20. Table 5, shown below, provides a summary of certain attributes of Example EVOH Pellets 1, 3, 8, and 10-20.

TABLE 5

|  | Ethylene Content of EVAC (mol %) | Amount of Example Fluoropolymer No. A (wt. %) | Fluorine Content | Particle Size range | Dispersion | 1st Melting Point Temp. (C. °) | 2nd Melting Point Temp. (C. °) |
|---|---|---|---|---|---|---|---|
| Example EVOH Pellets 1 | 29 | 1 | 3.5~41 | 1.2~5 | ○ | 121 | 186.9 |
| Example EVOH Pellets 3 | 29 | 5 | 9~43 | 1.5~18 | ○ | 125.1 | 186.3 |
| Example EVOH Pellets 8 | 44 | 1 | 3.6~30.6 | 1.2~9 | ○ | 110 | 164.7 |
| Example EVOH Pellets 10 | 44 | 5 | 10~40.6 | 2.5~12 | ○ | 123.3 | 164.8 |
| Example EVOH Pellets 11 | 32 | 2 | 4.6~42 | 1.6~5 | ○ | 115 | 182.6 |
| Example EVOH Pellets 12 | 38 | 2 | 4.8~46.5 | 1.5~8 | ○ | 111 | 171.9 |
| Example EVOH Pellets 13 | 27 | 1 | 3~25 | 2~4.5 | ○ | 124.6 | 189.8 |
| Example EVOH Pellets 14 | 27 | 2 | 5~42 | 2~7 | ○ | 125.2 | 189.6 |
| Example EVOH Pellets 15 | 27 | 4 | 8~46 | 2~8 | ○ | 125.1 | 189.6 |
| Example EVOH Pellets 16 | 32 | 1 | 3.1~30.2 | 2~5 | ○ | 116 | 182.7 |
| Example EVOH Pellets 17 | 38 | 3 | 6.8~47.1 | 2~10 | ○ | 111.5 | 172.1 |
| Example EVOH Pellets 18 | 48 | 1 | 3.7~35.4 | 2.2~15 | ○ | 110.5 | 158.8 |
| Example EVOH Pellets 19 | 48 | 2 | 3.8~42.1 | 2.5~15 | ○ | 112.7 | 158.7 |
| Example EVOH Pellets 20 | 48 | 3 | 6.3~43.5 | 2.8~19 | ○ | 113 | 159 |

The melting point temperatures of the EVOH Pellets was determined using a TA-Q200 differential scanning calorimeter, manufactured by TA instruments, according to the procedure of ISO 11357-3 (2011), utilizing the $1^{st}$ melting point temperature and $2^{nd}$ melting point temperature from the first run of thermoscan DSC.

Each of Example EVOH Pellets 1, 3, 8, and 10-20 exhibited excellent dispersion of the micro-particles containing fluorine. Moreover, Example EVOH Pellets 1, 3, 8, and 10-20 had micro-particles with sizes and fluorine contents in accordance with the desired ranges described herein. Example EVOH Pellets 1, 3, 8, and 10-20 each had two melting point temperatures with a first (lower) melting point temperature ranging from 110° C. to 125.2° C. and a second (higher) melting point temperature ranging from 158.7° C. to 189.9° C. Surprisingly, each of the foregoing Example EVOH Pellets exhibited improved processability and formed EVOH films having improved mechanical properties, regardless of their ethylene content. Without being limited to any specific theory, the inventors believe that EVOH resins and pellets thereof having micro-particles comprising fluoropolymers and having each particle size under 20 μm improves the processability and the mechanical properties of EVOH films formed therefrom. Notably, the amount of Example Fluoropolymer A did not directly and proportionally correlate to the range of fluorine content in the micro-particles.

Films were formed from Example EVOH Pellets 1, 3, 8, 10, 11, and 12 in accordance with methods similar to that described in Example 3. The films were assessed to determine the appearance of such films, the precipitation at the die, the Charpy impact strength of the films, and the elongation breakage of the films using the procedures and the qualitative valuation metrics discussed above. A summary of the properties of the films of Example EVOH Pellets 1, 3, 8, 10, 11, and 12 is provided below in Table 6.

TABLE 6

| | Film Appearance | Die precipitation | Charpy impact Strength (KJ/m$^2$) | Elongation Breakage (%) |
|---|---|---|---|---|
| Film of Example EVOH Pellets 1 | ○ | ○ | 2.45 | 17.8 |
| Film of Example EVOH Pellets 3 | ○ | ○ | 3.62 | 20.2 |
| Film of Example EVOH Pellets 8 | ○ | ○ | 5.45 | 23.9 |
| Film of Example EVOH Pellets 10 | ○ | ○ | 6.8 | 24.1 |
| Film of Example EVOH Pellets 11 | ○ | ○ | 3.1 | 18.2 |
| Film of Example EVOH Pellets 12 | ○ | ○ | 2.3 | 20.5 |

The films of Example EVOH Pellets 1, 3, 8, 10, 11, and 12 each exhibited no precipitation at the die and had less than three fisheyes with a size greater than 200 μm was less than 3 within a square meter. The Charpy impact strength of the films of Example EVOH Pellets 1, 3, 8, 10, 11, and 12 ranged from 2.3 to 6.8 KJ/m$^2$, while the elongation breakage of the films of Example EVOH Pellets 1, 3, 8, 10, 11, and 12 ranged from 17.8 to 24.1%.

EVOH pellets produced with Example Fluoropolymers A-D were compared to assess the effect of Example Fluoropolymers A-D on the formed EVOH pellets. Table 7, shown below, provides a summary of certain attributes of Example EVOH Pellets 1, 11, and 21-27.

TABLE 7

| | Ethylene Content of EVAC (mol %) | Example Fluoropolymer | Amount of Fluoropolymer (wt. %) | Fluorine Content | Particle Size range | Dispersion | $1^{st}$ Melting Point Temp. (C. °) | $2^{nd}$ Melting Point Temp. (C. °) |
|---|---|---|---|---|---|---|---|---|
| Example EVOH Pellets 1 | 29 | A | 1 | 3.5~41 | 1.2~5 | ○ | 121 | 186.9 |
| Example EVOH Pellets 11 | 32 | A | 2 | 4.6~42 | 1.6~5 | ○ | 115 | 182.6 |
| Example EVOH Pellets 21 | 32 | C | 2 | 6~40 | 2~11 | ○ | 120.7 | 181 |
| Example EVOH Pellets 22 | 32 | B | 0.5 | 2.1~30 | 1.3~7 | ○ | 130 | 180.9 |
| Example EVOH Pellets 23 | 32 | B | 1 | 3.9~42.5 | 1.5~8 | ○ | 118.5 | 181 |
| Example EVOH Pellets 24 | 32 | B | 2 | 4.2~46.9 | 1.5~8 | ○ | 113.7 | 181.5 |
| Example EVOH Pellets 25 | 32 | B | 3 | 5~47.2 | 1.6~10 | ○ | 117 | 181.2 |
| Example EVOH Pellets 26 | 29 | D | 1 | 1.6~20 | 0.6~1.5 | ○ | 132.5 | 185.4 |
| Example EVOH Pellets 27 | 29 | D | 3 | 2~20 | 0.5~2 | ○ | 133.7 | 185.7 |

Each of Example EVOH Pellets 1, 11, and 21-27 exhibited excellent dispersion of the micro-particles containing fluorine. Moreover, Example EVOH Pellets 1, 11, and 21-27 had micro-particles with sizes and fluorine contents in accordance with the desired ranges described herein. Example EVOH Pellets 1, 11, and 21-27 each had two melting point temperatures with a first (lower) melting point temperature in the range of 113.7° C. to 133.7° C. and a second (higher) melting point temperature in the range of 180.9° C. to 186.9° C.

Films were formed from Example EVOH Pellets 1, 11, and 21-27 in accordance with methods similar that described in Example 3. The films were assessed to determine the appearance of the film, the precipitation at the die, the charpy impact strength of the film, and the elongation breakage of the film using the procedures and the qualitative valuation metrics discussed above. A summary of the properties of the films of Example EVOH Pellets 1, 11, and 21-27 is provided below in Table 8.

TABLE 8

|  | Film Appearance | Die precipitation | Charpy impact Strength (KJ/m²) | Elongation Breakage (%) |
|---|---|---|---|---|
| Film of Example EVOH Pellets 1 | ◯ | ◯ | 2.45 | 17.8 |
| Film of Example EVOH Pellets 11 | ◯ | ◯ | 3.1 | 18.2 |
| Film of Example EVOH Pellets 21 | ◯ | ◯ | 2.9 | 18.4 |
| Film of Example EVOH Pellets 22 | ◯ | ◯ | 2.48 | 17.9 |
| Film of Example EVOH Pellets 23 | ◯ | ◯ | 2.68 | 18.2 |
| Film of Example EVOH Pellets 24 | ◯ | ◯ | 2.9 | 18.6 |
| Film of Example EVOH Pellets 25 | ◯ | ◯ | 3.2 | 19.2 |
| Film of Example EVOH Pellets 26 | ◯ | ◯ | 2.84 | 20.5 |
| Film of Example EVOH Pellets 27 | ◯ | ◯ | 3.3 | 22.4 |

The films formed from Example EVOH Pellets 1, 11, and 21-27 each exhibited no precipitation at the die and had less than three fisheyes with a size greater than 200 µm was less than 3 within a square meter. The Charpy impact strength for the films of Example EVOH Pellets 1, 11, and 21-27 were in the range of 2.45 to 3.3 KJ/m², while the elongation breakage for the films of Example EVOH Pellets 1, 11, and 21-27 were in the range of 17.8 to 22.4%.

As used herein, all ranges provided are meant to include every specific range within, and combination of sub ranges between, the given ranges. Additionally, all ranges provided herein are inclusive of the end points of such ranges, unless stated otherwise. Thus, a range from 1-5, includes specifically 1, 2, 3, 4, and 5, as well as sub ranges such as 2-5, 3-5, 2-3, 2-4, 1-4, etc.

All publications and patent applications cited in this specification are herein incorporated by reference, and for any and all purposes, as if each individual publication or patent application were specifically and individually indicated to be incorporated by reference. In the event of an inconsistency between the present disclosure and any publications or patent application incorporated herein by reference, the present disclosure controls.

As used herein, the terms "comprising," "having," and "including" are used in their open, non-limiting sense. The terms "a," "an," and "the" are understood to encompass the plural as well as the singular. The expression "one or more" means "at least one" and thus may include an individual characteristic or mixtures/combinations.

Other than in the operating examples, or where otherwise indicated, all numbers expressing quantities of ingredients and/or reaction conditions may be modified in all instances by the term "about," meaning within +/−5% of the indicated number. The term "substantially free" or "essentially free" as used herein means that there is less than about 2% of the specific characteristic. All elements or characteristics positively set forth in this disclosure can be negatively excluded from the claims.

What is claimed is:

1. An ethylene-vinyl alcohol pellet comprising:
   an ethylene-vinyl alcohol copolymer, and
   fluorine-containing micro-particles each having a particle size with a diameter or a length of the major axis that is not greater than 20 µm.

2. The ethylene-vinyl alcohol pellet of claim 1, further comprising:
   at least two melting point temperatures, a first melting point temperature and a second melting point temperature.

3. The ethylene-vinyl alcohol pellet of claim 2, wherein the first melting point temperature is from about 100° C. to about 140° C.

4. The ethylene-vinyl alcohol pellet of claim 3, wherein the first melting point temperature is from 105° C. to 135° C.

5. The ethylene-vinyl alcohol pellet of claim 2, wherein the second melting point temperature is from about 150° C. to about 195° C.

6. The ethylene-vinyl alcohol pellet of claim 5, wherein the second melting point temperature is from 158° C. to 190° C.

7. The ethylene-vinyl alcohol pellet of claim 1, wherein fluorine-containing micro-particles comprise about 1.5 to about 48 weight % of fluorine, based on the total weight of carbon, oxygen and fluorine elements.

8. The ethylene-vinyl alcohol pellet of claim 1, wherein the ethylene-vinyl alcohol copolymer has a degree of saponification of 99.5 mole % or more.

9. The ethylene-vinyl alcohol pellet of claim 1 being free of polyalkyleneoxides.

10. The ethylene-vinyl alcohol pellet of claim 1, wherein the diameter or the length of the major axis of the fluorine-containing micro-particles is about 1.0 to about 19 µm.

11. The ethylene-vinyl alcohol pellet of claim 10, wherein the diameter or the length of the major axis of the fluorine-containing micro-particles is about 1.2 to about 16 µm.

12. The ethylene-vinyl alcohol pellet of claim 1, wherein the ethylene-vinyl alcohol copolymer has an ethylene content of about 20 to about 50 mole %.

13. The ethylene-vinyl alcohol pellet of claim 12, wherein the ethylene content is about 25 to about 45 mole %.

14. The ethylene-vinyl alcohol pellet of claim 1, wherein the fluorine-containing micro-particles comprise a fluorinated polymer.

15. A film comprising the ethylene-vinyl alcohol of claim 1, wherein the film has a Charpy impact strength of at least 2.3 KJ/m² according to ISO 179-1 at 23° C. and an elongation at break of at least 17.8% according to ISO 527-2 at 23° C.

16. The film of claim 15, wherein the film has a Charpy impact strength of at least 2.6 KJ/m² according to ISO 179-1 at a temperature of 23° C.

17. The film of claim 15, wherein the film has an elongation at break of at least 20%.

18. The ethylene-vinyl alcohol pellet of claim 1, wherein the ethylene-vinyl alcohol copolymer comprises an ethylene content of about 20 to about 50 mole % and has a degree of saponification of 99.5 mole % or more; and the fluorine-containing micro-particles comprise a fluorinated polymer;

and wherein the ethylene-vinyl alcohol pellet comprises at least two melting point temperatures, a first melting point temperature of about 100° C. to about 140° C. and a second melting point temperature of about 150° C. to about 195° C.

19. A film comprising the ethylene-vinyl alcohol of claim 18, wherein the film has a Charpy impact strength of at least 2.3 KJ/m$^2$ according to ISO 179-1 at a temperature of 23° C. and an elongation at break of at least 17.8% according to ISO 527-2 at a temperature of 23° C.

\* \* \* \* \*